United States Patent [19]

Lexa

[11] Patent Number: 5,006,301
[45] Date of Patent: Apr. 9, 1991

[54] METHOD AND APPARATUS FOR CONTROL ROD DROP MONITORING

[75] Inventor: Anthony F. Lexa, Forest, Va.

[73] Assignee: Joyner Engineers and Trainers, Inc., Forest, Va.

[21] Appl. No.: 327,251

[22] Filed: Mar. 22, 1989

[51] Int. Cl.[5] .............................................. G21C 17/00
[52] U.S. Cl. ..................................... 376/259; 376/245; 376/258; 376/215; 376/240; 376/216
[58] Field of Search ............... 376/245, 258, 259, 240, 376/215, 216

[56] References Cited

U.S. PATENT DOCUMENTS

| | | | |
|---|---|---|---|
| 3,706,921 | 12/1972 | Rosen ................................ | 318/564 |
| 3,858,191 | 12/1974 | Neuner et al. .................... | 340/188 R |
| 3,899,727 | 8/1975 | Thayer ............................... | 318/564 |
| 3,914,794 | 10/1975 | Czerniejewski ................... | 444/1 |
| 4,434,132 | 2/1984 | Cook .................................. | 376/259 |
| 4,486,382 | 12/1984 | Gravelle et al. .................. | 376/216 |
| 4,661,310 | 4/1987 | Cook .................................. | 376/259 |
| 4,668,465 | 5/1987 | Boomgaard ....................... | 376/216 |
| 4,697,093 | 9/1987 | Sutherland ........................ | 376/245 |
| 4,752,433 | 6/1988 | Altman et al. .................... | 376/230 |

FOREIGN PATENT DOCUMENTS 0214020 9/1984 Fed. Rep. of Germany .
59-0154391 9/1984 Japan .

*Primary Examiner*—Brooks H. Hunt
*Assistant Examiner*—Meena Chelliah
*Attorney, Agent, or Firm*—Burns, Doane, Swecker & Mathis

[57] ABSTRACT

A control rod drop monitoring method and apparatus for use in a nuclear reactor including dedicated timers and displays to measure and display the drop time for each control rod when a reactor system trip occurs. The timers and displays may be made from CMOS technology, and may have millisecond resolution, if desired. The timers are initiated upon receipt of one or more reactor trip signals and are halted at the closure of switches for detecting the fully inserted or other preselected position of the control rods in the reactor core. The monitor system is designed for continuous operation. Reactor trip signals and limit switch signals are fed to latch circuits following a trip event or limit switch activation and are unaffected by subsequent changes in the state of the limit switches or trip signals. A manual reset is required to clear rod drop times. Also, a test mode is provided wherein all of the timers can be started and stopped, thereby providing a functional test of 100% of the monitor circuitry.

32 Claims, 3 Drawing Sheets

METHOD AND APPARATUS FOR CONTROL ROD DROP MONITORING

BACKGROUND AND SUMMARY OF THE INVENTION

1. Field of the Invention

The invention relates to a novel method and apparatus for monitoring the control rod drop times of the control rods of a nuclear reactor.

2. Description of Related Art

Nuclear reactors contain a control rod drive system wherein the core reactivity is maintained by the use of movable control rods interspersed throughout the core. These control rods control the overall reactor power level and provide the principal means of quickly and safely shutting down the reactor. The rods are vertically moved, usually by hydraulic or electromechanical mechanisms. The vertical movement of the rods may be upward into the core, or downward into the core depending on the type of reactor. The drive mechanisms provide both positioning and latching functions, and a scram function with the latter overriding any other signal to promptly shutdown the reactor. The reactor is shut down by fully inserting the control rods in the core. The period required for the control rods to reach the fully inserted position or some intermediate position from the initiation of a reactor trip signal (i.e., scram signal) is referred to as the rod drop time (irrespective of the type of reactor).

Within the United States, the Nuclear Regulatory Commission (NRC) requires in its licensing agreements with power companies operating nuclear reactors that the rod drop time be periodically tested and that the rod drop times be less than some minimum specified time. The rod drop time is typically measured between the initiation of the trip signal and when the rods reach the full insert position and/or when the control rods reach the snubber, which acts as a damper on the movement of the control rod to prevent the rod from impacting the end of its travel path at a speed that might cause damage, or some combination of these times. These tests are usually conducted after the reactor core has been substantially dismantled for periodic maintenance and refueling, to assure that the reactor has been properly reassembled. In the U.S. these tests are conducted in such a manner as to require that special equipment be installed at the time of the test in order to monitor the rod drop times of one or a few of the control rods. The test equipment is then reinstalled to test the drop times of additional control rods until all of the control rods are tested. Naturally, this procedure takes a great deal of time. Due in part to the test interconnections and to its bulk and expense, the test equipment is unsuitable for permanent installation or for measuring the rod drop time of all of the control rods.

Some of the problems with such a testing system are that the rod drop times are not continuously monitored since the test equipment is not permanently installed. Even when the test equipment is installed, not all of the control rods are monitored for rod drop times at one time. Further, the setting up of the test equipment is a relatively time consuming and expensive operation. Further, the time for test may be inconvenient to the operation of the plant.

Another control rod monitoring system is disclosed in German Patent No. 0 214 020. The system includes a device for measuring the control rod drop times of reactor control rods by monitoring the output of acoustic detectors located adjacent the travel path of the control rods. As the rod begins passing an acoustic detector, the detector output exceeds a threshold value and a timer is initiated. Once the rod completely passes the detector, the detector output signal falls below a threshold value and the timer is stopped. In this way, the control rod drop time and the travel time (i.e., speed) of the control rod are measured and displayed. One disadvantage with such a system is that though the detector may be positioned so as to indicate the full rod insert position, it cannot actually register that the control rod is in the full insert position.

Yet another control rod monitoring system is disclosed in Japanese Patent Publication No. 59-0154391. The system includes a high-speed scram control rod measuring apparatus having two sets of reed switches and one additional reed switch controlling a timer, to measure both rod drop time and travel time. The Japanese document discusses as background another rod drop timer wherein a reed switch sends a signal to a buffer time measuring meter. This reed switch registers the full insert position of a control rod. A dedicated timer and a separate display for the buffer time meter are disclosed. However, the signal produced by the reed switch must be processed through the circuitry of a larger system (which also measures the relative speed of the control rods), thereby requiring complicated signal processing circuitry. As the Japanese document points out, this other system requires a substantial amount of hardware which leads to complex and expensive problems.

The buffer time measuring meter of the Japanese invention is apparently initiated by the activation of the reed switch positioned near the insertion position of the monitored control rod (i.e., at the beginning of the control rod's travel path), rather than initiated by the occurrence of a trip signal. Therefore, the rod drop time is not accurately measured with reference to the reactor trip signal and may not be an accurate indication of the full rod drop time. The Japanese devices require a complicated signal processing section and a multiplicity of switches, some of which are cascaded in parallel, to detect the beginning of the control rod insertion and full insertion of the control rod.

In the past, the nuclear industry was faced with a choice of accepting a rod drop time monitoring system which involved complicated signal processing circuitry or otherwise raised questions of reliability, or no system at all. In the United States, a monitoring system has been utilized that had to be periodically installed in the reactor system to test the rod drop time of a selected few control rods at a time, which is expensive and time consuming.

Accordingly, it is an object of the present invention to provide an improved method and apparatus for control rod drop monitoring.

It is a further object of the present invention to provide a control rod drop monitoring method and apparatus that is reliable, efficient and relatively inexpensive to maintain and install.

Still a further object of the present invention is to provide a rod drop monitoring method and apparatus that can be easily and accurately tested.

Yet a further object of the invention is to provide a rod drop monitoring method and apparatus that includes sufficient safeguards against unintentional or unauthorized reset or disruption to the measured quantities.

The present invention achieves these objects and others by providing a control rod drop monitoring method and apparatus which may be permanently installed. The monitoring system includes dedicated timers and displays to measure and display the drop time for each and every control rod in a nuclear reactor anytime a system trip occurs.

The timers are initiated upon receipt of one or a combination of reactor trip signals and are halted at the closure of a limit switch located at the fully inserted or other preselected position of the control rod. The monitoring system is designed for continuous operation so as to capture all the rod drop times of all the control rods in the reactor system.

The reactor trip signal and limit switch signal are fed to a latch circuit following a trip event and are thereby unaffected by subsequent changes in the state of the limit switch or the reactor trip signals.

A further aspect of the present invention is that a manual reset is required via a key operated switch to clear rod drop times thereby providing a measure of security. The key operated switch is also required to enter the test mode thereby offering additional security against tampering or unintentional disruption of the measured quantities.

Another aspect is that the rod drop monitor system is 100% testable in the test mode wherein start and stop push buttons simultaneously activate and simultaneously halt all timers, respectively. Substantially all the circuitry of the monitor system is tested and the accuracy of an internal clock can be verified.

The timers and displays may be of relatively inexpensive digital type produced through CMOS technology and may have millisecond resolution, if desired. The use of CMOS and liquid crystal technologies enables the system to operate at a very low power consumption. Since the monitor system requires no computer hardware or software, involves a relatively simple circuit and can be custom built according to the specifications of a particular reactor, a substantially more reliable system can be offered at a relatively low cost as compared to the large complex systems mentioned above.

The rod drop monitor system of the present invention is accurate while facilitating easy testing of the rod drop time. The monitor system may operate continuously to quickly monitor all rod drop events in real time while fulfilling the essential requirements imposed by the NRC for such tests. The system is reliable and relatively inexpensive to acquire and operate as opposed to the previously mentioned systems. Furthermore, the system provides a measure of safety by displaying the rod drop times, and therefore any irregularity, in a manner which serves to quickly appraise the attendant of the existence of a problem and where in the rod drop system the problem exists. Additionally, the system provides security to assure that the tests are not deliberately or inadvertently altered before they can be officially noted.

BRIEF DESCRIPTION OF THE DRAWING FIGURES

A full understanding of the invention can be gained from the following description of the preferred embodiment, exemplary of the invention, when read in conjunction with the accompanying drawing figures, wherein like parts are designated by like reference numbers and wherein.

DETAILED DESCRIPTION OF THE PREFERRED EMBODIMENTS

Figure 1:
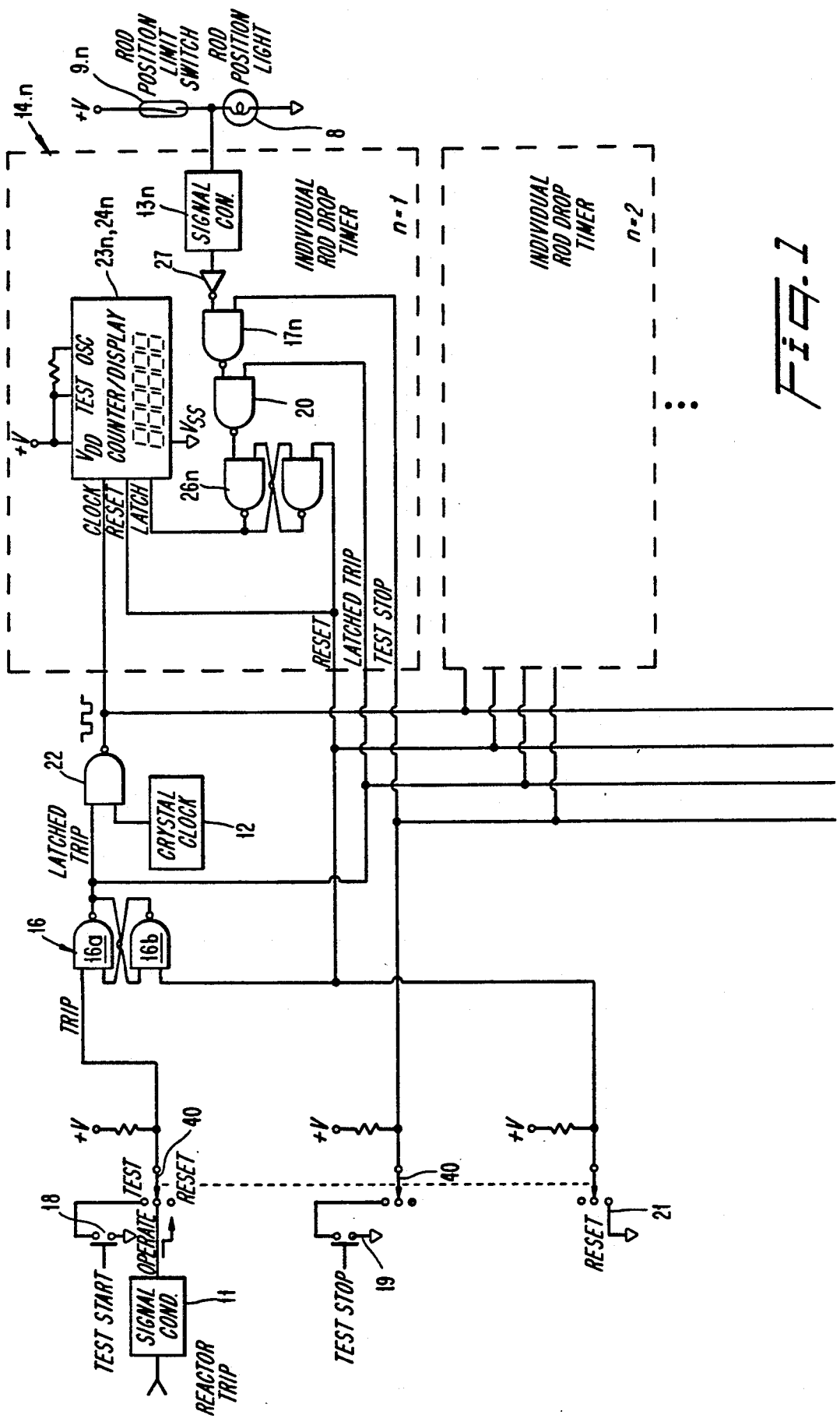
FIG. 1 is a diagram of a preferred embodiment in accordance with the present invention.

With reference to FIG. 1, a rod drop monitor system receives a reactor trip signal, i.e., a scram signal, from a preexisting reactor trip system of a reactor at a signal conditioning circuit 11 of the present invention. The reactor trip system in a conventional nuclear reactor actuates a control rod drive system. The rod drop timer system of the present invention is also initiated by the preexisting reactor trip system to actuate the rod drop timer system.

The signal conditioning circuit 11 forms an interface with the exterior circuitry of the reactor trip system to generate a discrete step function output at a preselected voltage value herein selected to reflect a logical 1. The conditioned trip signal serves to actuate a plurality of timers 14.1, 14.2, . . . 14.$n$ (wherein n is the number of control rods present in the reactor system), each timer being a associated with one control rod. Also a start test signal form switch 18 serves to actuate the timers in a test mode to be discussed subsequently.

The reactor trip signal or test signal is fed into a latch circuit 16 so that the latched output signal is unaffected by subsequent changes in the state of the scram signal or test signal. The latch circuit 16 may be of any formation which accepts a signal and holds it, i.e., locks in, or retains a signal until reset manually. Each timer 14 includes a counter 23 and a display 24. A crystal clock 12 produces clock pulses at one millisecond intervals which are input to an NAND gate 22 along with the latched signal.

Upon actuation of a reactor trip signal, the trip signal is locked into latch circuit 16 and the output of the latch circuit 16 actuates the timers 14 by permitting the passage of the clock pulses through the NAND gate 22 so that they may be counted by the counters 23. The counters 23 continue to count pulses until they are reset by the latch pin on the counters 23 going high. Prior to the receipt of a reactor trip signal by the latch circuit 16, no clock pulses are passed through NAND gate 22. The count is displayed on the displays 24, of each of the timers 14.

Upon actuation of a test signal switch 18 in the test mode, a test signal is locked into latch circuit 16 and the output of the latch circuit 16 actuates the timers 14 by permitting the passage of the clock pulses through the NAND gate 22 so that they may be counted by the counters 23, the count being displayed on the displays 24, of each of the timers 14. The test signal is input to the circuit just after the interface 11, thereby closely simulating the reactor trip signal for circuit testing purposes. By simulating the trip signal, substantially all of the circuitry of the rod drop monitor system is subjected to the test. Even the interface 11 may be tested by simulating a reactor trip signal by suitably adjusting the parameters of the external circuity.

Among the purposes of the latch circuit 16 is to detect and hold the leading edge of a reactor trip signal and to substantially reduce contact bounce problems.

A second input to each the timers 14.1, 14.2, ... 14.n is the output of respective limit switches 9.1, 9.2, ... 9.n located at the full insert or other fixed position of each of the control rods via a signal conditioning circuit 13, AND gate 17, NAND gate 20, invertor 27 and latch circuit 26. These limit switches 9 may be preexisting limit switches which might be used to monitor rod position, or may be installed in the reactor for the express purpose of providing a control rod insert position signal. The limit switches may be reed type switches, acoustical detector type switches, or any other suitable type of switch which can detect the control rod at the fully inserted position or other fixed position and produce either a binary or analog position signal. The rod drop time may be measured from the receipt of the trip signal to the fully inserted position, or to another fixed inserted position, e.g., 25%, 50%, 75% inserted or the position that the control rod interacts with a snubber, by preselecting the position of the limit switch along the control rod travel path.

The output of each of the limit switches are conditioned by signal conditioning circuits 13.1, 13.2 ... 13.n, which are similar in design and purpose to the signal conditioning circuits 11.1, 11.2, ... 11.n, and input through invertors 27.1, 27.2, ... 27.n, AND gates 17.1, 17.2, ... 17.n, NAND gates 20.1, 20.2, ... 20.n to latch circuits 26.1, 26.2, ... 26.n associated with each of the timers 14.1, 14.2, ... 14.n, respectively. The NAND gate 20 also receives the latched reactor trip signal output by latch circuit 16. The NAND gate 20 and the invertor 27 block the input of the limit switch signal to the latch circuit 26 unless a reactor trip signal has been received by the latch circuit 16.

A second input of the AND gates 17 is connected to a test stop switch 19 for stopping the testing of the monitor system in a test mode. Thus, the timers 14 are stopped either by the closure of one of the limit switches 9 associated with a control rod in a monitoring mode or by a test stop switch in a test mode.

The output of the test stop switch 19 is input into the monitor system circuit at about the same location as the output of the limit switches, thereby providing a test of all but the circuitry of the signal conditioning circuit 13. Even the signal conditioning circuit 13 can be tested by placing the AND gate 17 prior to the signal conditioning circuit 13 and suitably adjusting the parameters of the external circuity including the limit switch 9. Having the signal conditioning circuit 13 before the AND gate 17 is preferred because the monitor system is more readily adaptable to a wider variety of reactor systems in providing an interface which can accept a wider range of input signals.

A reset switch, which is part of switch 40, serves to reset the counter 23 and display 24 of each of the timers 14 to zero and to reset the latch circuits 16 and 26 to output a low logical value signifying that the monitor system is in a stand-by posture. The purpose of the reset switch is to assure that the rod drop times are not inadvertently or surreptitiously cleared or otherwise lost by requiring a purposeful act which can be preformed only by a restricted number of people. In a preferred embodiment, the switch 40 is a key operated switch 40 (shown in FIGS. 1 and 2) which must be activated be a key operator. This provides a measure of security and assurance that the rod drop time measured and displayed is accurate.

Figure 2:
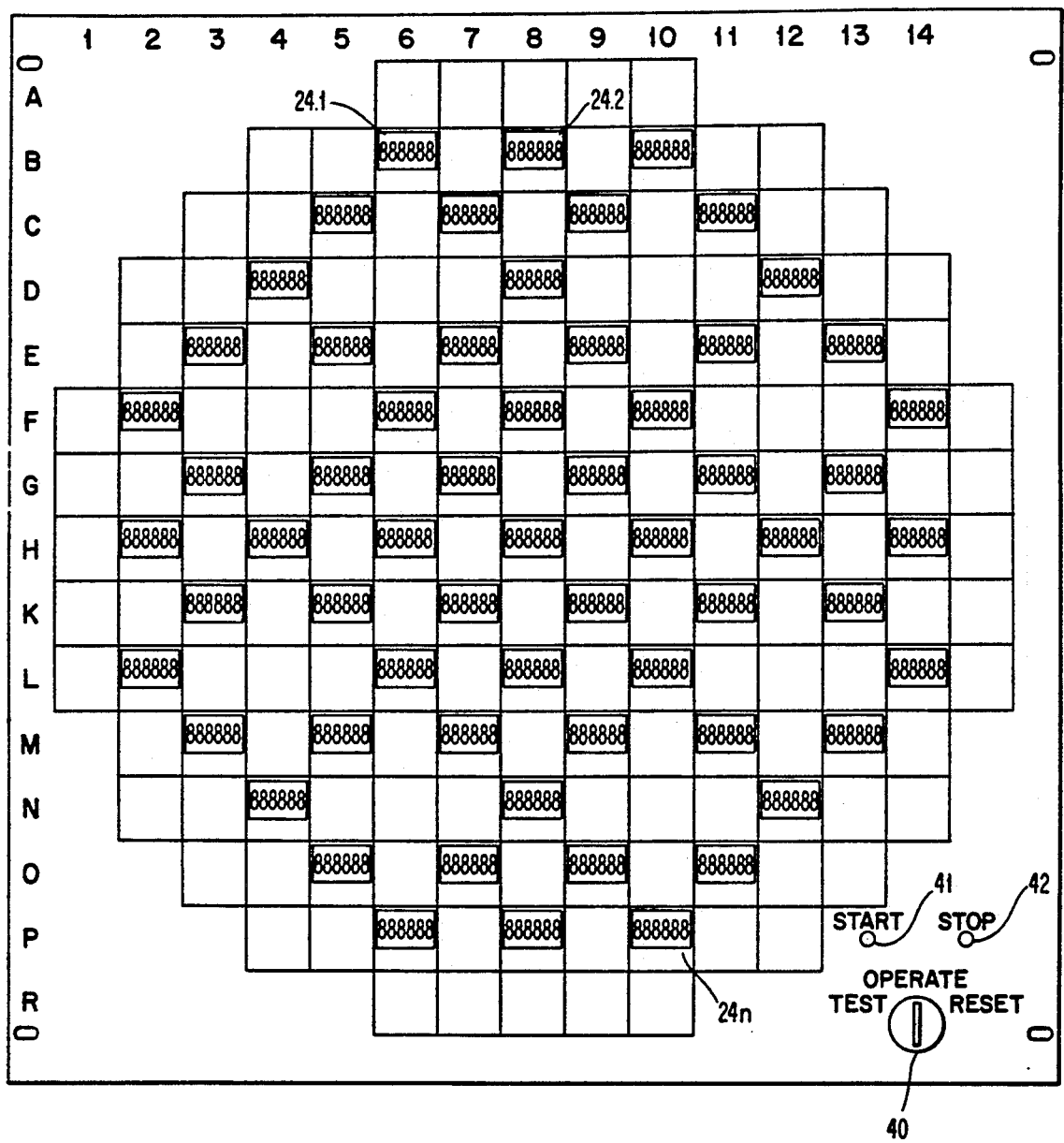
FIG. 2 is an exemplary display panel in accordance with a preferred embodiment of the present invention.
Figure 2A:
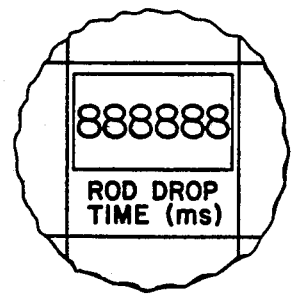

Once the trip signal has been received and all the rod drop times have been captured, none of the front panel switches shown in FIG. 2, without a key, can reset the timers. Also, no combination of reactor trip signals or limit switch signals, or both, will erase the rod drop times. Only the holder of the key can reset the rod drop times.

Figure 1A:
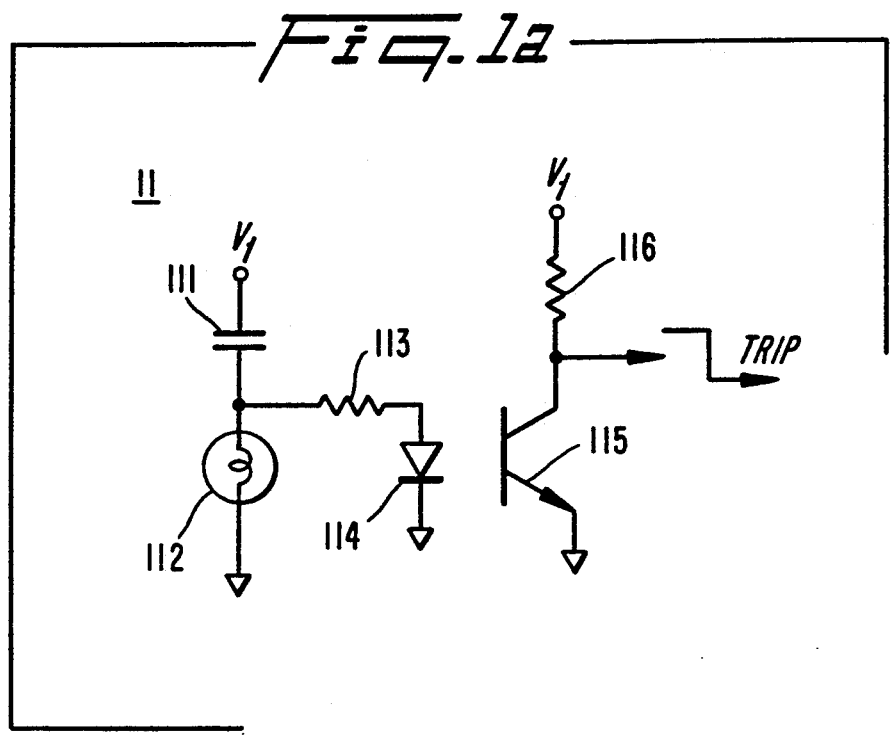
FIG. 1a is a diagram of an alternative embodiment of FIG. 1 in accordance with the present invention.
Figure 1B:
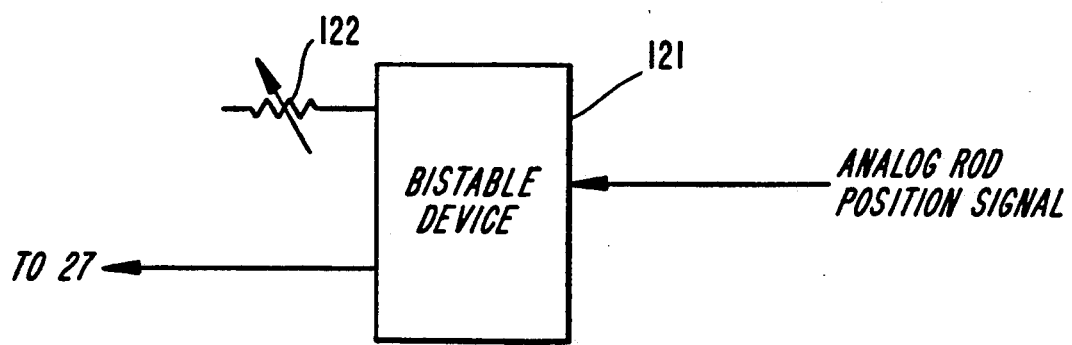
FIG. 1b is a diagram of an alternative embodiment of FIG. 1 in accordance with the present invention.

The signal conditioning circuit 11 of the preferred embodiment is an optical coupler similar to the one shown in FIG. 1a. A reactor trip signal generated by external circuitry is input to signal conditioning circuit 11 via a relay contact 111. The relay contact 111 is serially connected between a voltage source $V_1$ and an element 112, which may be an indicator light, the other end of which is grounded. The relay 111 and the indicator light 112 may be components pre-existing in the reactor system. The junction of the relay 111 and indicator light 112 is connected to a light emitting diode (LED) 114 via a resistor 113. The addition of the resistor 113 and LED 114 does not substantially effect the operation of the pre-existing reactor system. When a reactor is tripped, relay 111 closes and the LED 114 emits light, which is received by the phototransistor 115. The phototransistor 115 may be a common emitter transistor with the collector serially connected to a resistor 116 and a voltage source $V_1$. The conditioned trip signal is taken from the junction of the resistor 116 and the collector of the phototransistor 115.

The optical coupler effectively isolates the rest of the reactor system and the rod drop monitor system from each other, thereby adding an additional safeguard that the systems will not interfere with each others operation. Also, by tapping into the reactor trip system at the relay 111, the rod drop monitor system receives the trip signal relatively close to its source, thereby minimizing the possibility misreading the condition of the reactor trip system.

The output of this signal conditioning circuit 11 is input to a latch circuit 16 which outputs the inverse of the input signal, herein selected to be a high logical level. In the preferred embodiment, the logic circuit elements are CMOS devices because of their relatively low power consumption and low heat generation, but could be any type of suitable logic elements. In this embodiment, the latch circuit is formed by two cross-coupled NAND gates wherein the output of one NAND gate 16a is connected to one input of the other NAND gate 16b and the output of the other NAND gate 16b is connected to an input of the first NAND gate 16a. An initiation signal (trip or test) is input to the first NAND gate 16a and a reset signal is input to the other NAND gate 16b to thereby reset the latch circuit 16 in a stand-by mode. The contents of the latch circuit 16 are unaffected be subsequent changes in the state of the input signal and may be altered only be the reset signal, under normal conditions.

The output of the latch circuit 16 is input to an NAND gate 22. Another input of the NAND gate 22 receives the output generated by the crystal clock 12. Thus, the NAND gate 22 outputs a pulse signal at one millisecond intervals so long as the output of the latch circuit 16 remains high, i.e., after receiving a trip signal or test signal and before being reset by a reset signal. Before receipt of a trip signal and after receipt of a reset signal, no clock pulses are passed through NAND gate 22. The counters 23 will continue to count pulses after receipt of a trip signal until the latch pin of the counter 23 goes high. The output of the NAND gate 22 is input to a counter 23 of each of the timers 14, which counts up the number of clock pulse signals generated (so long as the output of the latch circuit 16 is not reset) and displays the count on the display 24.

In the preferred embodiment, the display 24 includes liquid crystal displays (LCDs) because of their relatively low power consumption, low heat generation, compatibility with the CMOS technology of the other circuit elements and their compactness. However, any suitable type of display, such as LEDs plasma displays, nixie tubes, etc., could be used. The counter 23 continues counting until a signal generated by the limit switch 9 stops it or until a reset signal generated in the reset mode is receive by the monitor system circuit. The receipt of a reset signal by the latch circuit 16 causes the latch circuit 16 to output a low logic value, thereby preventing the NAND gate 22 from passing the clock pulses generated by the system clock 12.

The output of each limit switch 9.1, 9.2, ... 9.$n$, upon its closure due to the control rod being fully inserted or at some preselected location, is conditioned by signal conditioning circuit 13. The signal conditioning circuit 13, limit switch 9 and an indicator light 8, which may be a pre-existing element, may be replaced by the bistable device 121 of FIG. 1$b$ to accommodate an analog rod position signal. In this embodiment, a bistable device 121 receives an analog rod position signal and a threshold value set by a variable resistor 122. When the analog signal meets or exceeds the threshold, an signal is generated to stop the timer circuits 14.

The conditioned signal is input to a respective latch circuit 26. The latch circuit 26 is similar in construction to latch circuit 16 and serves to retain the output of the limit switches 9. The contents of the latch circuit 26 are unaffected by subsequent changes in the condition of the limit switch 9. The output of each latch circuit 26.1, 26.2, ... 26.$n$ is input to the counter 23 of each timer 14 to stop the counter 23 and thereby stop in the increment of the numbers shown on the display 24. Thus, upon activation of one of the limit switches 9, the associated rod drop timer 14 accurately displays on display 24 the rod drop time to a one millisecond resolution. Each control rod of the reactor system has a timer display 24 associated with it to accurately convey the rod drop time to a millisecond resolution in a readily understandable format to quickly alert or otherwise inform the reactor system operators of the rod drop times of each control rod. Thus, the rod drop monitor functions as an added safety system by alerting the reactor system operators of any errors in the control rod drop by indicating an unusual amount of time required for the rod to reach its fully inserted position.

As with the latch circuit 16, the contents of the latch circuit 26 are unaffected by subsequent changes in the output of the limit switch 9 and may be modified only by the reset signal, under normal circumstances.

The reset signal generated by a reset switch, which is part of switch 40, the reset signal serves to reset the latches 16 and 26.1, 26.2, ... 26.$n$ as well as to reset the counter 23 to zero. The resetting of the counter 23 also serves to reset the displayed value to zero on the display 24 in the preferred embodiment, but it is contemplated that separate circuit elements could be provided to reset the display. The reset signal initializes the monitor circuit for receipt of the next trip signal or test signal.

With reference to FIG. 2, a preferred embodiment of the external appearance of the display face of a rod drop time monitor system, which, by way of example, typically includes sixty-one (61) rod drop time displays depicted in a graphical representation of the relative position of control rods in the core of the reactor to which the separate displays are associated. Naturally, any number of displays could be incorporated, either to reflect the number of control rods present in the system or for added redundancy to the reactor system by associating more than one timer per control rod. The graphical representation of the displays, or core map, assists the reactor system operators in quickly determining what is occurring to each individual control rod with reference to its relative position within the core. Thus, an operator is able to quickly and easily determine whether and to which control rods irregularities are occurring within the core during a rod drop event.

The manually operated switch 40, preferably key operated, serves to select between an operating mode in which the rod drop timer monitoring system is prepared to be activated upon actuation of a trip signal from the reactor trip system, or a test mode in which the monitor system can be tested, or a reset mode in which the monitor system can be reset to an initialized posture. The key operated switch 40 may be in the form of a turn-key switch, an electronic key coded input device or any other suitable switch which provides a measure of security against unauthorized or unintentional actuation. Suitable circuit elements may be incorporated to inhibit the mode selection by the key operated switch 40 so that the monitor circuit cannot be switched to a reset mode or test mode while the monitor system is actively monitoring a rod drop event. In the preferred embodiment, the key can be removed in the "OPERATE" position only. Therefore the removal of the key from the switch 40 acts as a means to inhibit mode selection.

In a monitoring mode, the switch 40 is turned to the switch position indicated by the legend "OPERATE". In this position, the monitor system is either in a stand-by posture while awaiting receipt of a trip signal, or actively monitoring a rod drop event while timing and displaying the rod drop time, or awaiting a reset signal while displaying the final rod drop time after receiving the full insert signal of the limit switch 9. This OPERATE position is the normal state of the system.

In the test mode, the switch 40 is turned to the position indicated by the legend "TEST", which enables a start test push button switch and a stop test push button switch. In this position, a push button switch 41 (which is either closely coupled or identical to switch 18 shown in FIG. 1) may be actuated for starting a test operation thereby initiating all the timers 14 simultaneously. Thereafter, a push button switch 42 (which is closely coupled or identical to switch 19 shown in FIG. 1) may be actuated to stop all the timers 14 simultaneously. The circuitry, including the clock pulse generator 12, is tested by comparing display of the timer displays 24 to the output of an independent timer, such as a stop watch, which is started and stopped concurrently with the starting and stopping of the test, respectively. Since the test start and stop signals closely simulate, and are introduced at substantially the same location in the monitor circuit as the actual reactor trip signal and output of the limit switches 9, respectively, substantially all of the circuitry of the present invention (with the exception of the limit switches 9 and possibly the signal conditioning circuits 11 and 13) is tested during the test mode operation.

The key operated switch 40 can also be set in a reset mode by turning the switch to the position indicated by the legend "RESET". In this position, all of the timers 14 are reset to zero and the latch circuits 16 and 26 are reset to output a low signal, thereby initializing the monitoring system in preparation for the next reactor trip signal or test signal depending on the subsequently chosen position of the key operated switch 40. The key operated switch 40 may serve as, or be closely coupled to, switch 21, shown in FIG. 1, in the reset mode.

Numerous modification and adaptations of the present invention will be apparent to those skilled in the art and thus it is intended by the appended claims to cover all such modifications and adaptations which fall within the true spirit and scope of the present invention. For instance, the circuit described herein may be powered by an external power supply, or an internal power supply, such as a battery. The internal supply may serve as a back up to the external supply.

What is claimed is:

1. A system for continuously monitoring a plurality of control rod drop times in a reactor, comprising:
   means for receiving a reactor trip signal and for generating an initiation signal;
   a plurality of timer circuits, each timer circuit being associated with one of a plurality of control rods, including
   means for receiving a control rod position signal indicative of each associated control rod at a predetermined insert position and for generating a deactivation signal,
   first latching means for retaining said initiation signal generated by said receiving means,
   second latching means for retaining said deactivation signal received by said receiving means,
   a timer actuated by said initiation signal and said timer being deactivated by said deactivation signal, and
   means for displaying the output of said timer to represent the individual rod drop time.

2. The system according to claim 1, further comprising:
   a manually operable switch for resetting said plurality of timer circuits.

3. The system according to claim 1, further comprising:
   test means for simulating said initiation signal and said deactivation signal thereby testing said monitor system.

4. The system according to claim 1, wherein said timer has a resolution of at least 1 millisecond.

5. The system according to claim 1, further comprising:
   means for detecting said control rods at a predetermined insert position and for generating said signal indicative of a control rod at said predetermined insert position.

6. The system according to claim 1, wherein said means for receiving said control rod position signal includes a bistable device for receiving an analog position signal.

7. The system according to claim 1, further comprising means for supplying power to the system including a battery.

8. The system according to claim 1, wherein said means for receiving a reactor trip signal includes an optical coupler.

9. The system according to claim 1, wherein the number timer circuits is at least equal to the number of control rods in the reactor.

10. A system for continuously monitoring a plurality of rod drop times in a reactor, comprising:
    a plurality of timer circuits, each of which is associated with one of a plurality of control rods, said timer circuits each including a timer actuated by a reactor trip signal and deactivated by a control rod insert position signal indicative of an associated control rod being at a predetermined inserted position;
    means for displaying the output of said timer circuits representing the rod drop time; and
    a manually operable switch for resetting said plurality of timer circuits.

11. The system according to claim 10, further comprising:
    test means for simulating said reactor trip signal and said control rod insert position signal to test said monitor system.

12. The system according to claim 10, further comprising:
    first latching means for retaining said reactor trip signal.

13. The system according to claim 10, further comprising latching means for retaining said control rod position signal indicative of a control rod at a predetermined inserted position and for generating a deactivation signal for said timer circuits.

14. The system according to claim 12, wherein each of said timer circuits include;
    second latching means for retaining said signal indicative of a control rod at its fully inserted position, and
    a timer actuated by said reactor trip signal retained by said first latching means and deactivated by said signal retained by said second latching means.

15. The system according to claim 10, wherein said timer has a resolution of at least 1 milliseconds.

16. The system according to claim 10, further comprising:
    means for detecting said control rods at a predetermined insert position and for generating said signal indicative of an associated control rod at said predetermined insert position.

17. A system for continuously monitoring a plurality of rod drop times in a reactor, comprising:
    means for receiving a reactor trip signal and for generating an initiation signal;
    a plurality of timer circuits, each of said timer circuits including
    means for receiving a rod position signal indicative of a control rod at a predetermined inserted position and for generating a deactivation signal,
    a timer initiated upon receipt of said initiation signal and deactivated upon receipt of said deactivation signal,
    means for displaying the output of said timer to represent the rod drop time of each control rod; and
    test means for simulating a reactor trip signal and a rod position signal to test said monitor system.

18. The system according to claim 17, further comprising:
    first latching means for retaining said initiation signal.

19. The system according to claim 18, wherein each of said timer circuits include;
    second latching means for retaining said deactivation signal.

20. The system according to claim 17, further comprising:

a key operated switch for resetting said plurality of timer circuits.

21. The system according to claim 17, wherein said timer has a resolution of at least 1 milliseconds.

22. The system according to claim 17, further comprising:
means for detecting said control rods at a full insert position and for generating said signal indicative of a control rod at its fully inserted position.

23. A system for continuously monitoring a plurality of rod drop times in a reactor, comprising:
a plurality of timer circuits including
first latching means for latching a signal indicative of a reactor trip signal,
second latching means for latching a control rod position signal indicative of a control rod at a predetermined position,
a timer actuated by said signal latched in said first latching means and deactivated by said control rod position signal latched in said second latching means, and
means for displaying the output of said timer to represent the individual rod drop time;
a key operated switch for resetting said plurality of timer circuits; and
test means for simulating said signal indicative of a reactor trip signal and said control rod position signal to test said system.

24. The system according to claim 23, wherein said timer has a resolution of at least 1 milliseconds.

25. The system according to claim 23, further comprising:
means for detecting said control rods at a predetermined position and for generating said control rod position signal indicative of a control rod at a predetermined position.

26. A method of continuously monitoring a plurality of rod drop times in a reactor, comprising the steps of:
generating an output from a plurality of timer circuits for timing the rod drop times including the steps of
retaining in a signal indicative of a reactor trip signal,
subsequently retaining in a control rod position signal indicative of a control rod at a predetermined inserted position,
actuating a timer with said retained signal indicative of a reactor trip signal and deactivating said timer with said retained control rod position signal; and
displaying the output of said timer circuits to represent the rod drop time.

27. The method according to claim 26, further comprising the step of selectively resetting said plurality of timer circuits.

28. The method according to claim 26, further comprising the step of simulating said signal indicative of a reactor trip signal and said control rod position signal by a test means to test said monitor system.

29. The method according to claim 26, wherein said timer has a resolution of at least 1 milliseconds.

30. The according to claim 26, further comprising the step of:
detecting said control rods at a full insert position and generating said control rod position signal indicative of a control rod at its fully inserted position.

31. The according to claim 26, further comprising the step of:
detecting said control rods at a predetermined position and generating said control rod position signal indicative of a control rod at said predetermined position.

32. A system for continuously monitoring a plurality of rod drop times in a reactor, comprising:
a plurality of timer circuits, each of which is associated with one of a plurality of control rods, said timer circuits each including a timer actuated by a reactor trip signal and deactivated by a control rod insert position signal indicative of an associated control rod being at a predetermined inserted position;
means for displaying the output of said timer circuits representing the rod drop time wherein said display means forms a geographical representation of the relative position of the individual control rods within the core of said reactor.

* * * * *